UNITED STATES PATENT OFFICE 2,353,710

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application June 15, 1942,
Serial No. 447,167

8 Claims. (Cl. 252—341)

This invention relates primarily to the resolution of petroleum emulsions.

The main object of our invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object is to provide an economical and rapid process for separating emulsions which have been prepared under controlled conditions from mineral oil, such as crude petroleum and relatively soft waters or weak brines. Controlled emulsification and subsequent demulsification under the conditions just mentioned is of significant value in removing impurities, particularly inorganic salts, from pipeline oil.

We have discovered that if one oxyalkylates glycerol so as to introduce at least three oxyalkylene radicals for each hydroxyl group, and if the product so obtained is reacted with a polybasic carboxy acid having not over eight carbon atoms, and in such a manner as to yield a fractional ester, due to the presence of at least one free carboxyl radical, one can then esterify said acidic material or intermediate product with at least one mole of an alcoholic compound of the type herein described to give a variety of new compositions of matter which have utility in the demulsification of crude oil.

The compounds herein contemplated may be produced in any suitable manner, but are usually manufactured by following one of two general procedures. In one of said procedures the oxyalkylated glycerol, which is, in essence, a polyhydric alcohol, is reacted with a polybasic acid so as to give an acidic material, or intermediate product, which, in turn, is reacted with an alcoholic body of the kind hereinafter described, and momentarily indicated by the formula $R_1(OH)_m$. Generically, the alcoholic body herein contemplated may be considered a member of the class in which $m$ may vary from 1 to 10, although the specific significance of $m$ in the present instance will be hereinafter indicated. The second procedure is to react an alcohol of the formula type $R_1(OH)_m$ with a polybasic acid so as to produce an intermediate product, and then react said intermediate product or fractional ester with the selected oxyalkylated glycerol.

Glycerol may be conveniently indicated by the following formula:

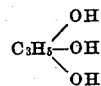

If treated with an oxyalkylating agent, and momentarily consideration will be limited to an oxyethylating agent, one may obtain an oxyethylated glycerol of the following formula type:

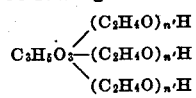

in which the value of $n'$ may vary from 3 to 10 and all the values of $n'$ need not be identical. If a polybasic carboxy acid be indicated by the formula:

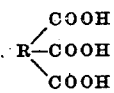

then the acyclic reaction product of one mole of oxyethylated glycerol and one mole of a polybasic carboxy acid may be indicated by the following formula:

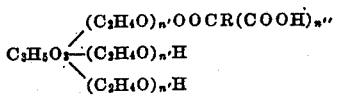

in which $n''$ has the value of one or two. Similarly, if two moles of the polybasic acid be used, then the compound may be indicated by the following formula:

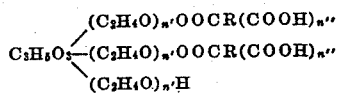

Likewise, if three moles of a polybasic acid are employed, the compound may be indicated by the following formula:

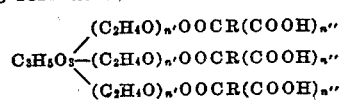

If a fractional ester of the kind exemplified by the three preceding formulas is reacted with one or more moles of an alcohol of the kind previously described in a generic sense as $R_1(OH)_m$, then obviously, one may obtain a material of the type indicated by the following formula:

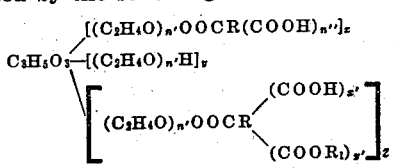

in which $x$ is 0, 1 or 2, $y$ is 0, 1 or 2, and $z$ is 1, 2 or 3, and $x'$ is 0 or 1, and $y'$ is 1 or 2.

It has been previously stated that compounds of the type herein contemplated may be obtained by oxyalkylating agents, without being limited to ethylene oxide. Suitable oxyalkylating agents include ethylene oxide, propylene oxide, butylene oxide and glycid, which, although not included, strictly speaking, by the unitary structure $C_nH_{2n}O$, is included within the meaning of the hereto appended claims and may be simply considered as a varient of propylene oxide, i. e., hydroxypropylene oxide. Similarly, where a carboxylic hydrogen atom appears, it may be replaced by metal, an ammonium radical, or substituted ammonium radical, or by an organic group derived from an alcohol, such as an aliphatic alcohol, an aralkyl alcohol, or an alicyclic alcohol. It may also be converted into an amide, including a polyaminoamide. Thus, the preceding formula may be rewritten in its broader scope, as follows:

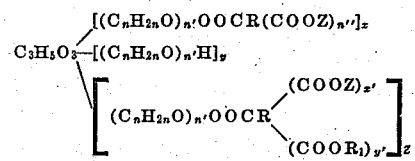

in which $n$ replaces the numbers 2, 3 or 4, Z includes the acidic hydrogen atom itself. In the above formula, and hereafter for convenience, $R_1$ is intended to include any hydroxyl groups that remain.

If the compounds herein contemplated are obtained under usual conditions, at the lowest temperatures, then the monomeric form is most likely to result.

The production of the compounds herein contemplated is the result of one or more esterification steps. As is well known, esterification procedures can be carried out in various manners, but generally speaking, esterifications can be carried out at the lowest feasible temperatures by using one or several procedures. One procedure is to pass an inert dried gas through the mass to be esterified, and have present at the same time a small amount of a catalyst, such as dried HCl gas, a dried sulfonic acid, or the like. Another and better procedure, in many instances, is to employ the vapors of a suitable liquid, so as to remove any water formed and condense both the vapors of the liquid employed and the water in such a manner as to trap out the water and return the liquid to the reacting vessel. This procedure is commonly employed in the arts, and for convenience, reference is made to U. S. Patent No. 2,264,759, dated December 2, 1941, to Paul C. Jones.

Referring again to the last two formulas indicating the compounds under consideration, it can be readily understood that such compounds, in numerous instances, have the property of polyfunctionality. In view of this fact, where there is at least one residual carboxyl and at least one residual hydroxyl, one would expect that under suitable conditions, instead of obtaining the monomeric compounds indicated, one would, in reality, obtain a polymer in the sense, for example, that polyethylene glycols represent a polymer of ethylene glycol. The term "polymer" is frequently used to indicate the polymerized product derived from a monomer in which the polymer has the same identical composition as the monomer. In the present instance, however, polymerization involves the splitting and loss of water so that the process is essentially self-esterification. Thus, strictly speaking, the polymeric compounds are not absolutely isomers of the monomeric compounds, but since, for all practical purposes, they can be so indicated, and since such practice is common in the arts concerned with materials of this type, it is so adopted here.

Thus, reference in the appended claims to polymers is intended to include the self-esterification products of the monomeric compounds.

In view of what has been said, and in view of the recognized hydrophile properties of the recurring oxyalkylene linkages, particularly the oxyethylene linkage, it is apparent that the materials herein contemplated may vary from compounds which are clearly water-soluble through self-emulsifying oils, to materials which are balsam-like and sub-resinous or semi-resinous in nature. The compounds may vary from monomers to polymers, in which the unitary structure appears a number of times, for instance, 10 or 12 times. It is to be noted that true resins, i. e., truly insoluble materials of a hard plastic nature, are not herein included. In other words, the polymerized compounds are soluble to a fairly definite extent, for instance, at least 5% in some solvents, such as water, alcohol, benzene, dichloroethyl ether, acetone, cresylic acid, acetic acid, ethyl acetate, dioxane, or the like. This is simply another way of stating that the polymerized product contemplated must be of the sub-resinous type, which is commonly referred to as an A resin, or a B resin, as distinguished from a C resin, which is a highly infusible, insoluble resin (see Ellis, Chemistry of Synthetic Resins (1935), pages 862, et seq.).

Reviewing the form as presented, it is obvious that one may obtain compounds within the scope disclosed, which contain neither a free hydroxyl nor a free carboxyl group, and one may also obtain a compound of the type in which there is present at least one free carboxyl, or at least one free hydroxyl, or both. The word "polar" has sometimes been used in the arts in this particular sense to indicate the presence of at least one free hydroxyl group, or at least one free carboxyl group, or both. In the case of the free carboxyl group, the carboxylic hydrogen atom may, of course, be replaced by any ionizable hydrogen atom equivalent, such, for example, as a metal, an ammonium radical, a substituted ammonium radical, etc. In the hereto appended claims the word "polar" is used in this specific sense.

We are aware that compounds similar to those contemplated in the present instance may be derived from polyhydroxylated compounds having more than three hydroxyl groups. For instance, they may be derived from acyclic diglycerol, triglycerol, tetraglycerol, mixed polyglycerols, mannitol, sorbitol, various hexitols, dulcitol, pentaerythritol, sorbitan, mannitan, dipentaerylthritol, monoether, and other similar compounds. Such particular types in which higher hydroxylated materials are subjected to oxyalkylation and then employed in the same manner as oxyalkylated glycerol, is employed in the present instance, are not contemplated in this specific case, although attention is directed to the same.

Reference is also made to other oxyalkylated compounds which may be used as reactants to replace oxyalkylated glycerol, or oxyalkylated ethylene glycol, which latter reactant is described in a co-pending application hereinafter referred to. The reactants thus contemplated include the type in which there is an amino or amido nitrogen atom. Particularly, when present in a low molal type of compound prior to oxyalkylation, reference being made to polyhydroxylated materials, including those having two or three hydroxyl groups, as well as those having more than three hydroxyl groups. For instance, the oxyalkylated derivatives, particularly the oxyethylated derivatives of ethyldiethanolamine, bis(hydroxyethyl)-actamide, the acetamide of tris(hydroxymethyl) aminomethane, tetrahydroxylated ethylene diamine, etc. Compounds may also be derived from cyclic diglycerol and the like.

Furthermore, for convenience, attention is directed to a somewhat similar class of materials which are described in our co-pending application Serial No. 410,086, filed Sept. 8, 1941, now Patent No. 2,333,769 dated July 20, 1943. Said co-pending application involves the use of the same type of alcoholic bodies for reactants, but is limited, among other things, to the compounds which are essentially symmetrical in nature, for instance, involving the introduction of two alcoholic residues, whereas, in the present instance, one, two, or three, or more, might be introduced.

As indicated previously, the polybasic acids employed are limited to the type having not more than eight carbon atoms, for example, oxalic, malonic, succinic, glutaric, adipic, maleic, and phthalic. Similarly, one may employ acids such as fumaric, glutaconic, and various others, such as citric, malic, tartaric, and the like. The selection of the particular tribasic or dibasic acid employed, is usually concerned largely with the convenience of manufacture of the finished ester, and also the price of the reactants. Generally speaking, phthalic acid or anhydride tends to produce resinous materials, and greater care must be employed if the ultimate or final product be of a subresinous type. Specifically, the preferred type of polybasic acid is such as to contain six carbon atoms or less. Generally speaking, the higher the temperature employed, the easier it is to obtain large yields of esterified product, although polymerization may be stimulated. Oxalic acid may be comparatively cheap, but it decomposes readily at slightly above the boiling point of water. For this reason it is more desirable to use an acid which is more resistant to pyrolysis. Similarly, when a polybasic acid is available in the form of an anhydride, such anhydride is apt to produce the ester with greater ease than the acid itself. For this reason, maleic anhydride is particularly adaptable, and also, everything else considered, the cost is comparatively low on a per molar basis, even though somewhat higher on a per pound basis. Succinic acid or the anhydride has many attractive qualities of maleic anhydride, and this is also true of adipic acid. For purposes of brevity, the bulk of the examples, hereinafter illustrated, will refer to the use of maleic anhydride, although it is understood that any other suitable polybasic acid may be employed. Furthermore, reference is made to derivatives obtained by oxyethylation, although, as previously pointed out, other oxyalkylating agents may be employed.

As far as the range of oxyethylated glycerols employed as reactants is concerned, it is our preference to employ those in which approximately 15 to 24 oxyethylene groups have been introduced into a single glycerol molecule. This means that approximately five to eight oxyethylene radicals have been introduced for each original hydroxyl group.

The oxyalkylation of glycerol is a well known procedure (see Example 11 of German Patent No. 605,973, dated November 22, 1934, to I. G. Farbenindustrie Akt. Ges.). The procedure indicated in the following three examples is substantially identical with that outlined in said aforementioned German patent.

OXYETHYLATED GLYCEROL

Example 1

184 pounds of glycerol is mixed with ½%, by weight, of caustic soda solution having a specific gravity of 1.383. The caustic soda acts as a catalyst. The ethylene oxide is added in relatively small amounts, for instance, about 44 pounds at a time. The temperature employed is from 150–180° C. Generally speaking, the gauge pressure during the operation approximates 200 pounds at the maximum, and when reaction is complete, drops to zero, due to complete absorption of the ethylene oxide. When all the ethylene oxide has been absorbed and the reactants cooled, a second small portion, for instance, 44 more pounds of ethylene oxide, are added and the procedure repeated until the desired ratio of 15 pound moles of ethylene oxide to one pound mole of glycerol is obtained. This represents 660 pounds of ethylene oxide for 192 pounds of glycerol.

OXYETHYLATED GLYCEROL

Example 2

The ratio of ethylene oxide is increased to 18 pound moles for each pound mole of glycerol. Otherwise, the same procedure is followed as in Example 1, preceding.

OXYETHYLATED GLYCEROL

Example 3

The same procedure is followed as in the two previous examples, except that the ratio of ethylene oxide to glycerol is increased to 21 to 1.

OXYETHYLATED GLYCEROL MALEATE

Example 1

One pound of oxyethylated glycerol (1 to 15 ratio) prepared in the manner previously described is treated with one pound mole of maleic anhydride and heated at approximately 110° C. for approximately thirty minutes to two hours, with constant stirring, so as to yield a monomaleate.

OXYETHYLATED GLYCEROL MALEATE

Example 2

The same procedure is followed as in the preceding example, except that two moles of maleic anhydride are employed so as to obtain the dimaleate instead of the monomaleate.

OXYETHYLATED GLYCEROL MALEATE

Example 3

The same procedure is followed as in the two preceding examples, except that three moles of maleic anhydride are employed so as to obtain the trimaleate.

OXYETHYLATED GLYCEROL MALEATE

Example 4

The same procedure is employed as in the preceding examples, except that oxyethylated glycerol (ratio 1 to 18) is substituted in place of oxyethylated glycerol (ratio 1 to 15).

OXYETHYLATED GLYCEROL MALEATE

Example 5

The same procedure is employed as in the preceding examples, except that oxyethylated glycerol (ratio 1 to 21) is employed instead of oxyethylated glycerol (ratio 1 to 15) or (1 to 18).

Previous reference has been made to an alcoholic body which has been defined generically by the formula $R_1(OH)_m$. The sub-generic class of alcoholic compounds employed as reactants in the manufacture of the present compounds, are basic hydroxylated polyacylated polyamino amides containing:

(a) Two acyl radicals derived from a non-hydroxy monocarboxy acid, preferably non-hydroxy in nature, having not more than 5 carbon atoms and linked to the two terminal nitrogen atoms;

(b) An acyl radical derived from a detergent-forming monocarboxy acid having at least 8 and not more than 32 carbon atoms; and (c) An alcoholiform hydroxyl radical.

The preferred form of alcoholic body is characterized by not only the three above enumerated characteristics, but also the additional characteristic of having present a basic amino hydrogen group, i. e., an amino hydrogen radical free from directly linked acyl radicals or aryl radicals. Furthermore, this preferred type of alcoholic body, as well as the modification having no hydroxyl groups, is effective as a demulsifier per se under the same conditions, and when used in the same manner as the demulsifier herein contemplated. As far as we are aware, such type of material, subsequently described in greater detail, is a new composition of matter per se.

Attention is directed to our two co-pending applications for Patent Serial Nos. 401,378 and 401,381, both filed July 7, 1941, now Patents Nos. 2,324,490 and 2,324,493, respectively, both dated July 20, 1943.

As examples of reactants employed in the manufacture of the alcoholic bodies herein contemplated, particularly as intermediates, there are included among others, diethylenetriamine, triethylenetetramine, tetraethylenepentamine, and comparable derivatives derived from propylene dichloride, butyl dichloride, amylene dichloride, and the like. Indeed, instead of using propylene dichloride as a reactant for producing a satisfactory polyamine for use as a raw material, one can employ the comparable amine derived from glycerol dichlorhydrin, i. e., beta-hydroxy propylene dichloride.

The detergent-forming acids include those acids which combine with alkalies to produce soap or soap-like bodies. The detergent-forming acids, in turn, include naturally-occurring fatty acids, resin acids, such as abietic acid, naturally-occurring petroleum acids, such as naphthenic acids, carboxy acids produced by the oxidation of petroleum, etc.

As to oxidized petroleum acids, see U. S. Patent No. 2,242,837, dated May 20, 1941, to Shields.

As is well known, there are other acids having similar characteristics and derived from a somewhat different source and different in structure, but which can be included within the broad generic term previously indicated. Such acids have at least 8 carbon atoms and not more than 32 carbon atoms, and the most desirable form is exemplified by the fatty acids, particularly the unsaturated fatty acids, more especially by ricinoleic acid.

The low molal acids having 5 carbon atoms or less, are exemplified by acetic acid, formic acid, propionic acid, butyric acid, furoic acid, lactic acid, hydroxybutyric acid, etc.; however, the non-hydroxylated type are most desirable, i. e., the type other than lactic acid, hydroxybutyric acid, etc. A number of suitable amines have already been suggested.

Reference is made to U. S. Patent No. 2,243,329, dated May 27, 1941, to De Groote and Blair. This patent lists a large number of polyamines containing three or more basic amino groups. It also includes description of procedure generally employed for acylation by means of a high molal or low molal acid. It is understood, of course, that one need not employ the acid itself, but the acid radical may be introduced by employing an ester, anhydride, amide, acyl chloride, or any other suitable form.

Reference to the aforementioned U. S. Patent No. 2,243,329 is for the purpose of including all suitable reactants therein mentioned with the same force and effect as if they were repeated in the present instance.

The following examples will serve to illustrate the manufacture of such acylated polyamino compounds. It is to be noted that in many instances it is most convenient to first introduce an acyl radical of a low molal carboxy acid of the kind described, and then introduce the acyl radical from a high molal carboxy acid of the kind described. The introduction of the high molal acyl radical may be in an amido form or in an ester form. In some instances this may require the treatment of the first acylation product with ethylene oxide or the like. All of this is obvious to the skilled chemist, in view of what has been said; but the following examples will illustrate the matter even further:

INTERMEDIATE ACYLATION PRODUCT

*Example 1*

One pound mole of diethylene triamine is treated with 2 pound moles of methyl acetate so as to give a diacetylated product of the type characterized by the fact that the two acetyl radicals are attached to the terminal nitrogen atoms, the reason being that the primary amino radical acylates more readily than the secondary amino radical.

INTERMEDIATE ACYLATION PRODUCT

*Example 2*

One pound mole of the product of the kind described under Example 1, preceding, is treated with one pound mole of ethylene oxide, so as to give the hydroxyethyl derivative.

INTERMEDIATE ACYLATION PRODUCT

*Example 3*

The same procedure is followed as in Example 2, except that 2 pound moles of ethylene oxide are used, thus introducing a hydroxylated radical containing an ether linkage. In other words, the secondary amino hydrogen atom is replaced by the group $C_2H_4OC_2H_4OH$.

INTERMEDIATE ACYLATION PRODUCT

*Example 4*

Triethylene tetramine is substituted for diethylenetriamine in the Intermediate acylation product, Examples 1, 2 and 3, preceding. It is to be noted in this instance, however, that the use of two moles of ethylene oxide produces two hydroxyethyl groups in the oxyethylated product; and in order to introduce the group

$C_2H_4OC_2H_4OH$ one must employ at least 3 moles of ethylene oxide.

INTERMEDIATE ACYLATION PRODUCT

Example 5

The same procedure is followed as in Example 4, except that tetraethylenepentamine is substituted for triethylenetetramine. In this instance, in order to obtain a hydroxylated radical containing the ether linkage, at least 4 moles of ethylene oxide must be employed.

INTERMEDIATE ACYLATION PRODUCT

Example 6

Products comparable to Examples 1–5, preceding, are obtained from polyamines, which, in turn, instead of being derivatives of ethylene dichloride, are derivatives of propylene dichloride.

INTERMEDIATE ACYLATION PRODUCT

Example 7

Polyamines derived from glycerol dichlorhydrin (betahydroxypropylene dichloride):

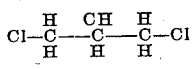

are substituted for the amines employed in the preceding example, i. e., amines derived from propylene dichloride.

COMPLETELY ACYLATED PRODUCTS

Example 1

One pound mole of the products of the kind described in Intermediate acylation products, Examples 1–7, inclusive, are treated with one pound mole of oleic acid, so as to produce a polyamino amide of the kind previously described.

COMPLETELY ACYLATED PRODUCTS

Example 2

Ricinoleic acid is substituted for oleic acid in the previous example.

COMPLETELY ACYLATED PRODUCTS

Example 3

Naphthenic acid is substituted for oleic acid in the previous example.

COMPLETELY ACYLATED PRODUCTS

Example 4

Abietic acid is substituted for oleic acid in the previous examples.

COMPLETELY ACYLATED PRODUCTS

Example 5

Oxidized petroleum acids of the kind described in aforementioned Shields Patent No. 2,242,837, having approximately 12–16 carbon atoms and being of the branch chain type, are substituted for oleic acid in the previous example.

COMPLETELY ACYLATED PRODUCTS

Example 6

In some instances, where derived from tetramine or penta-amino compounds, it is possible to introduce more than one high molal acyl group. For instance, one might introduce two recinoleyl radicals, or one ricinoleyl radical and one oleyl radical.

It has been previously pointed out that the alcoholic bodies herein contemplated for reaction with nonaethylene glycol dihydrogen dimaleate or the equivalent dibasic fractional ester, represent, in part, a sub-genus of a broader class, and that this broader classification per se represents valuable demusifying agents without further reaction.

The alcoholic bodies herein employed as reactants need not have a basic amino nitrogen atom, and obviously, do not have when derived from a reactant such as diethylenetriamine in certain instances. For example, if one pound mole of diethylenetriamine is reacted with 2 pound moles of acetic acid or its equivalent, one obtains the diacetylated product. If such product is then acylated, for example, with ricinoleic acid, the resultant product is hydroxylated, but is not basic in character, insofar that there is not present an amino nitrogen atom free from linkage with an aryl radical or acyl radical. It is well known that linkage of an amino nitrogen atom with an acyl radical, or with an aryl radical, enormously reduces or substantially eliminates basicity.

If, however, such diacetylated diethylenetriamine is treated with one mole of ethylene oxide and if such product is then treated with ricinoleic acid, the acyl radical, or more specifically, the ricinoleyl radical, enters as part of an ester linkage and not an amido linkage. Such product exemplifies a type which is an alcoholic body, and is also basic in character, i. e., a valuable demulsifier as is, without further reaction. Furthermore, if the same oxyethylated product is treated with oleic acid, the resultant compound is also a valuable demulsifier, but is of no value for manufacturing the final composition of matter herein contemplated, for the reason that there is no residual hydroxyl radical to permit combination with nonaethylene glycol dihydrogen dimaleate, or the like.

From a practical standpoint, the manufacture of the reagents which are valuable demulsifying agents, although not alcoholic bodies, has already been suggested. This is obvious by referring back to Intermediate acylation products, Examples 4 and 5, wherein there are directions for treating triethylenetetramine and tetraethylenepentamine with 2 moles of acetic acid, methyl acetate, or the like, so as to convert the primary amino groups into the diacetylated derivatives. Since there still remain 2 or 3 basic amino nitrogen atoms, one can acylate with a high molal acid, such as oleic acid, ricinoleic acid, or the like, in fact, might introduce two such acids in the instance where the derivative is obtained from tetraethylenepentamine. If derived from a hydroxylated acid, such as ricinoleic acid, then the intermediate would serve as an alcoholic body; but if derived from oleic acid, abietic acid, naphthenic acid, or the like, this would not be true. However, such product would serve as a demulsifier without further reaction with nonaethylene glycol, or the like. Similarly, regardless of whether the high molal acyl group introduced contained a hydroxyl radical or not, i. e., even in such instances where the product is derived from oleic acid, naphthenic acid, or the like, the reaction product can be treated further with ethylene oxide, propylene oxide, or the like, so as to introduce a hydroxyethyl or an $OHC_2H_4OC_2H_4$ radical, and thus permit subsequent reaction with nonaethylene glycol dihydrogen dimaleate, if desired. However, this type of material, i. e., where there is present 2 terminal acyl radicals derived from a low molal carboxy acid, and where there is present at least 2 basic amino nitrogen atoms, and at least one high molal acyl radical, one has an effective demulsifier. If hydroxylated, it may serve as an alcoholic body for reaction with nonaethylene glycol dihydrogen dimaleate; and alccholic bodies of a similar type containing no basic amino group, will also serve as reactants for combination with nonaethylene glycol dihydrogen dimaleate or the like.

As specific examples of the types of compounds which may be employed as demulsifiers for water-in-oil emulsions, without reaction with nonaethylene glycol dihydrogen dimaleate, attention is directed to the following:

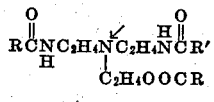

Structural formula A

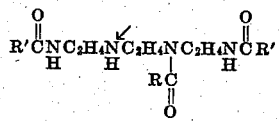

Structural formula B

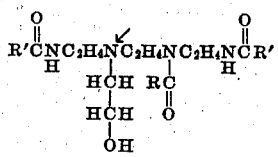

Structural formula C

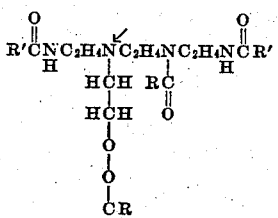

Structural formula D

R'CO represents acyl radicals of low molal carboxy acids, and RCO, radical of high molal carboxy acids, which may or may not be hydroxylated, i. e., may represent oleic acid or ricinoleic acid.

In each instance the arrow points to the basic amino group.

Comparable products may be derived from tetraethylenepentamine in which the same basic type of radical appears, or a combination of basic types. It is to be noted that the efficient method of producing the compounds herein contemplated is by first treating the selected primary raw material with acetic acid or the like, so as to introduce the terminal acetyl radicals, the reason being that such reactions are readily controllable so as to enter the terminal position, since the terminal amino groupings are primary amino groups and acylate more rapidly and more completely than the internal amino groups which are secondary amino radicals. In compounds of the kind just described, it is to be emphasized once more that these represent valuable demulsifiers as is, and as far as we are aware, new compositions of matter per se. Where hydroxylated, whether it be due to the presence of a hydroxyethyl group, a ricinoleyl group, or the like, such compounds may serve for reaction as an alcoholic body with nonaethylene glycol dihydrogen dimaleate or the like to give the other composition of matter herein contemplated. Furthermore, we are aware that valuable derivatives can be obtained by reaction with other polybasic materials, such as phthalic anhydride, and perticularly for use as demulsifiers for water-in-oil emulsions of the kind herein referred to.

COMPLETED MONOMERIC DERIVATIVE

Example 1

One pound mole of a product of the kind described under the heading "Oxyethylated glycerol maleate, Example 1" is reacted with one pound mole of "Completely acylated product, Example 2," preferably in the absence of any high boiling hydrocarbon or inert solvent. However, if an inert vaporizing solvent is employed, it is generally necessary to use one which has a higher boiling range than xylene, and sometimes removal of such solvent might present a difficulty. In other instances, however, such high boiling inert vaporizing solvent, if employed, might be permitted to remain in the reacted mass and appear as a constituent or ingredient of the final product. In any event, our preference is to conduct the reaction in the absence of any such solvent and permit the reaction to proceed with the elimination of water. The temperature of reaction is about 180 to 200° C. and time of reaction about 20 hours.

COMPLETED MONOMERIC DERIVATIVE

Example 2

The same procedure is followed as in Completed monomeric derivative, Example 1, preceding, except that the dimaleate described under the heading "Oxyethylated glycerol maleate, Example 2" is used instead of the monomaleate.

COMPLETED MONOMERIC DERIVATIVE

Example 3

The same procedure is followed as in the two preceding examples, except that the trimaleate is substituted for the monomaleate or dimaleate in the two preceding examples.

COMPLETED MONOMERIC DERIVATIVE

Example 4

The same procedure is followed as in Examples 2 and 3, immediately preceding, except that for each pound mole of the maleate, or each pound mole of the trimaleate, instead of using one pound mole of an alcoholic reactant of the kind employed in Examples 1 to 3, preceding, as a reactant, one employs two pound moles.

COMPLETED MONOMERIC DERIVATIVE

Example 5

The same procedure is followed as in Example 3, preceding, except that for such pound mole of trimaleate, instead of adding one pound mole of an alcoholic reactant of the kind employed in Examples 1 to 3, preceding, one adds three pound moles of an alcoholic reactant of the kind employed in Examples 1 to 3, preceding for reaction.

COMPLETED MONOMERIC DERIVATIVE

Example 6

Reference to the preceding examples will show that in each and every instance oxyethylated glycerol (ratio 1 to 15) has been employed as a raw material or primary reactant. In the present instance, a more highly oxyethylated glycerol is employed, to wit, one involving the ratio of 1 to 18. (See Oxyethylated glycerol maleate, Example 4, preceding.)

Completed Monomeric Derivative

Example 7

The same procedure is followed as in Example 6, immediately preceding, except that the oxyethylated glycerol employed represents one having an even higher degree of oxyethylation. For example, one indicated by the ratio of 1 to 21. (See Oxyethylated glycerol maleate, Example 5, preceding.)

Completed Monomeric Derivative

Example 8

The same procedure is followed as in Examples 1 to 7, preceding, except that the alcoholic reactant employed for reaction with the oxyethylated glycerol maleate is of the kind described under the heading "Completely acylated product, Example 1."

Completed Monomeric Derivative

Example 9

The same procedure is followed as in Examples 1 to 7, preceding, except that the alcoholic reactant employed for reaction with the oxyethylated glycerol maleate is of the kind described under the heading "Completely acylated product, Example 5".

Completed Monomeric Derivative

Example 10

The same procedure is followed as in Examples 1 to 7, preceding, except that the alcoholic reactant employed for reaction with the oxyethylated glycerol maleate is of the kind described under the heading "Completely acylated product, Example 6".

The method of producing such fractional esters is well-known. The general procedure is to employ a temperature above the boiling point of water and below the pyrolytic point of the reactants. The products are mixed and stirred constantly during the heating and esterification step. If desired, an inert gas, such as dried nitrogen or dried carbon dioxide, may be passed through the mixture. Sometimes it is desirable to add an esterification catalyst, such as sulfuric acid, benzene sulfonic acid, or the like. This is the same general procedure as employed in the manufacture of ethylene glycol dihydrogen diphthalate. (See U. S. Patent No. 2,075,107, dated March 30, 1937, to Frasier.)

Sometimes esterification is conducted most readily in the presence of an inert solvent, that carries away the water of esterification which may be formed, although as is readily appreciated, such water of esterification is absent when such type of reaction involves an acid anhydride, such as maleic anhydride, and a glycol. However, if water is formed, for instance, when citric acid is employed, then a solvent such as xylene may be present and employed to carry off the water formed. The mixture of xylene vapors and water vapors can be condensed so that the water is separated. The xylene is then returned to the reaction vessel for further circulation. This is a conventional and well-known procedure and requires no further elaboration.

In the previous monomeric examples there is a definite tendency, in spite of precautions, at least in a number of instances, to obtain polymeric materials and certain cogeneric by-products. This is typical, of course, of organic reactions of this kind, and as is well known, organic reactions per se are characterized by the fact that 100% yields are the exception, rather than the rule, and that significant yields are satisfactory, especially in those instances where the by-products or cogeners may satisfactorily serve with the same purpose as the principal or intentional product. This is true in the present instance. In many cases when the compound is manufactured for purposes of demulsification, one is better off to obtain a polymer in the sense previously described, particularly a polymer whose molecular weight is a rather small multiple of the molecular weight of the monomer; for instance, a polymer whose molecular weight is two, three, four, five, or six times the molecular weight of the monomer. Polymerization is hastened by the presence of an alkali, and thus, in instances where it is necessary to have a maximum yield of the monomer, it may be necessary to take such precautions that the alkali used in promoting oxyethylation of glycerol, be removed before subsequent reaction. This, of course, can be done in any simple manner by conversion to sodium chloride, sodium sulfate, or any suitable procedure.

In the preceding examples of the Completed monomeric derivatives, Examples 1 to 10, inclusive, no reference is made to the elimination of such alkaline catalyst, in view of the effectiveness of the low multiple polymers as demulsifiers. Previous reference has been made to the fact that the carboxylic hydrogen atom might be variously replaced by substituents, including organic radicals, for instance, the radicals obtained from alcohols, hydroxylated amines, non-hydroxylated amines, polyhydric alcohols, etc. Obviously, the reverse is also true, in that a free hydroxyl group may be esterified with a selected acid, varying from such materials as ricinoleic acid to oleic acid, including alcohol acids, such as hydroxyacetic acid, lactic acid, ricinoleic acid and also polybasic acids of the kind herein contemplated.

With the above facts in mind, it becomes obvious that what has been previously said as to polymerization, with the suggestion that by-products or cogeneric materials were formed, may be recapitulated with greater definiteness, and one can readily appreciate that the formation of heat-rearranged derivatives or compounds must take place to a greater or lesser degree. Thus, the products herein contemplated may be characterized by being monomers of the type previously described, or esterification polymers, or the heat-rearranged derivatives of the same, and thus including the heat-rearranged derivatives of both the polymers and esterification monomers, separately and jointly. Although the class of materials specifically contemplated in this instance is a comparatively small and narrow class of a broad genus, yet it is obviously impossible to present any adequate formula which would contemplate the present series in their complete ramification, except in a manner employed in the hereto appended claims.

Although the products herein contemplated vary so broadly in their characteristics, i. e., monomers through sub-resinous polymers, soluble products, water-emulsifiable oils or compounds, hydrotropic materials, balsams, sub-resinous materials, semi-resinous materials, and the like, yet there is always present the characteristic unitary hydrophile structure related back to the oxyalkylation, particularly the oxyethylation of the glycerol used as the raw material. As hereinafter indicated, in the resolution of oil field emulsions, the demulsifier may be added to the emulsion at the ratio of 1 part in 10,000, 1 part in 20,000, 1 part in 30,000, or for that matter, 1 part in 40,000. In such ratios it well may be that one cannot differentiate between the solubility of a compound completely soluble in water in any ratio, and a semi-resinous product apparently insoluble in water in ratios by which ordinary insoluble materials are characterized. However, at such ratios the importance must reside in interfacial position and the ability to usurp, preempt, or replace the interfacial position previously occupied perhaps by the emulsifying colloid. In any event, reviewed in this light, the obvious common property running through the entire series, notwithstanding variation in molecular size and physical make-up, is absolutely apparent. Such statement is an obvious oversimplification of the rationale underlying demulsification, and does not even consider the resistance of an interfacial film, to crumbling, displacement, being forced into solution, altered wetability, and the like. As to amidification polymers, for instance, where Z is a polyaminoamide radical, see what is said subsequently.

COMPLETED POLYMERIC DERIVATIVES INCLUDING HEAT-REARRANGED COGENERS

Example 1

A polyfunctional monomer of the kind described under the headings "Completed monomeric derivative, Examples 1 to 7" is heated at a temperature of approximately 220–240° C., with constant stirring, for a period of two to 60 hours, so as to eliminate sufficient water in order to insure that the resultant product has a molecular weight approximately twice that of the initial monomer.

COMPLETED POLYMERIC DERIVATIVES INCLUDING HEAT-REARRANGED COGENERS

Example 2

The same procedure is followed as in the preceding example, except that polymerization is continued, using either a somewhat longer reaction time, or it may be a somewhat higher temperature, or both, so as to obtain a material having a molecular weight of approximately three to four times that of the initial product.

COMPLETED POLYMERIC DERIVATIVES INCLUDING HEAT-REARRANGED COGENERS

Example 3

The same procedure is followed as in Examples 1 and 2, preceding, except that one selects the polyfunctional monomer from the type exemplified by the materials described under the headings "Completed monomeric derivatives, Examples 8 to 10, inclusive."

COMPLETED POLYMERIC DERIVATIVES INCLUDING HEAT-REARRANGED COGENERS

Example 4

The same procedure is followed as in Examples 1 to 3, preceding, except that one polymerizes a mixture instead of a single monomer, for instance, a mixture of materials of the kind described in Completed monomeric derivative, Example 3, and in Completed monomeric derivative, Example 4, are mixed in molecular proportion and subjected to polymerization in the manner indicated in the previous examples.

It is understood, of course, that the polymerized product need not be obtained as a result of a two-step procedure. In other words, one need not convert the reactants into the monomer, and then subsequently, convert the monomer into the polymer. The reactants may be converted through the monomer to the polymer in one step. Indeed, the formation of the monomer and polymerization may take place simultaneously. This is especially true if polymerization is conducted in the absence of a liquid such as xylene, as previously described, and if one uses a comparatively higher temperature, for instance, approximately 220° C. for polymerization. Thus, one pound mole of an oxyethylated glycerol polymaleate of the kind described is mixed with a polyfunctional alcoholic reactant of the kind described under the heading "Completely acylated product, Example 2." Such mixture is reacted at approximately 20 hours at about 220° C. until the mass is homogeneous. It is stirred constantly during reaction. Polyfunctionality may reside in dehydration (etherization) of two hydroxyl groups attached to dissimilar molecules.

The fact that the polymerized and heat-rearranged products can be made in a single step, illustrates a phenomenon which sometimes occurs either in such instances where alcoholic bodies of the kind herein illustrated are contemplated as reactants, or where somewhat kindred alcoholic bodies are employed. The reactants may be mixed mechanically to give a homogeneous mixture, or if the reactants do not mix to give a homogeneous mixture, then early in the reaction stage there is formed, to a greater or lesser degree, sufficient monomeric materials so that a homogeneous system is present. Subsequently, as reaction continues, the system may become heterogeneous and exist in two different phases, one being possibly an oily body of moderate viscosity, and the other being a heavier material, which is sticky or sub-resinous in nature. In many instances it will be found that the thinner liquid material is a monomer and the more viscous or resinous material is a polymer, as previously described. Such product can be used for demulsification by adding a solvent which will mutually dissolve the two materials, or else, by separating the two heterogeneous phases and employing each as if it were a separate product of reaction.

Conventional demulsifying agents employed in the treatment of oil field emulsions are used as such, or after dilution with any suitable solvent, such as water; petroleum hydrocarbons such as gasoline, kerosene, stove oil, a coal tar product such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials herein described, when employed as demulsifiers for water-in-oil emulsions, may be admixed with one or more of the solvents customarily used in connection with conventional demulsifying agents, provided that such compounds are compatible. They will be compatible with the hydrophile type of solvent in all instances. Moreover, said material or materials may be used alone, or in admixture with other suitable well-known classes of demulsifying agents.

It is well-known that conventional demulsifying agents may be used in a water-soluble form, or in an oil-soluble form, or in a form exhibiting both oil and water-solubility. Sometimes they may be used in a form which exhibits relatively limited oil-solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials herein described, except that they are invariably water-soluble.

We desire to point out that the superiority of the reagent or demulsifying agent contemplated in our herein described process for breaking petroleum emulsions, is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our improved process for resolving petroleum emulsions of the water-in-oil type, a treating agent or demulsifying agent of the kind above described is brought into contact with or caused to act upon the emulsion to be treated, in any of the various ways, or by any of the various apparatus now generally used to resolve or break petroleum emulsions with a chemical reagent, the above procedure being used either alone, or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to their emergence. This particular type of application is decidedly feasible when the demulsifier is used in connection with acidification of calcareous oil-bearing strata, especially if suspended in or dissolved in the acid employed for acidification.

Cognizance must be taken of the fact that the surface of the reacting vessel may increase or decrease reaction rate and degree of polymerization, for instance, an iron reaction vessel speeds up reaction and polymerization, compared with a glass-lined vessel.

As has been previously indicated, the sub-genus employed as an alcohol in the present instance is one of a series of alcoholic compounds which are contemplated in our co-pending applications Serial Nos. 447,151, 447,152, 447,153, 447,154, 447,155, 447,156, 447,157, 447,158, 447,159, 447,160, 447,161, 447,162, 447,163, 447,164, 447,165, 447,166 and 447,168, filed June 15, 1942.

It is to be noted that in such instances where the alcoholic body contains a reactive amino hydrogen atom, for instance, in the case where an acylated hydroxylated polyamine is employed, for example, the ricinoleyl acid ester of hydroxyethyl ethylenediamine, the oxyethylated glycerol maleate might react to form an amide of maleic acid. In such instances, of course, such type, to wit, the amido type, is contemplated within the scope of the appended claims in the particular instance, but elaboration is eliminated, because it is unnecessary and would only incur greater length of descriptive matter. Thus, stated in another way, in all appropriate instances, the expression "esterification polymers" in the appended claims, includes amidification polymers, as well as esterification polymers.

Having thus described our invention, what we claim as new and desire to secure by Letters Patent is:

1. A process for breaking petroleum emulsions of the water-in-oil type, characterized by subjecting the emulsion to the action of a demulsifier comprising a member of the class consisting of monomers, sub-resinous esterification polymers, and cogeneric sub-resinous heat-rearranged derivatives of the monomers and aforementioned polymers, separately and jointly, and of the following formula:

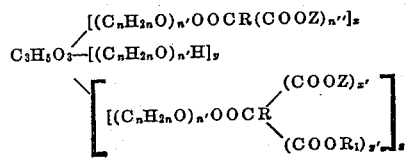

in which R is the carboxyl-free radical of a polybasic carboxy acid having not over 8 carbon atoms; $R_1$ is a

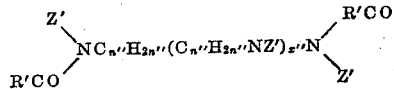

radical in which $n''$ represents a small whole number varying from 2 to 10; $x''$ is a small whole number varying from 1 to 10; $Z'$ is a member of the class consisting of H, R''CO, R'CO, and D, in which R''CO is an acyl radical of a detergent-forming monocarboxy acid having at least 8 carbon atoms and not more than 32 carbon atoms, R'CO is an acyl radical of a lower molecular weight carboxy acid having 5 carbon atoms or less; and D is a radical of the class consisting of an alkyl, hydroxyalkyl, aminoalkyl, and acyloxyalkylene, in which instance the acyl group is a member of the class consisting of RCO and R'CO; and the polyacylated polyamine radical must contain a member of the class consisting of: (a) acyloxyalkylene radical in which the acyl group is RCO; and (b) joint occurrence of an amido radical in which the acyl group is RCO and a hydroxyalkyl radical; Z is an acidic hydrogen atom equivalent including the acidic hydrogen atom itself; $n$ represents the numerals 2 to 4; $n'$ represents the numerals 3 to 10; $n''$ represents the numerals 1 to 2; $x$ represents the numerals 0 to 2; $y$ represents the numerals 0 to 2; $z$ represents the numerals 1 to 3; $x'$ represents the numerals 0 to 1; and $y'$ represents the numerals 1 to 2.

2. A process for breaking petroleum emulsions of the water-in-oil type, characterized by subjecting the emulsion to the action of a desmulsifier comprising a member of the class consisting of monomers, sub-resinous esterification polymers, and cogeneric sub-resinous heat-rearranged derivatives of the monomers and aforementioned polymers, separately and jointly, and of the following formula:

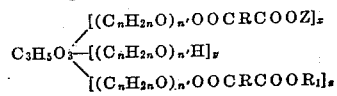

in which R is a carboxyl-free radical of a dibasic carboxy acid having not over 6 carbon atoms; R₁ is a

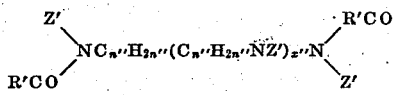

radical in which $n''$ represents a small whole number varying from 2 to 10; $x''$ is a small whole number varying from 1 to 10; Z' is a member of the class consisting of H, R''CO, R'CO, and D, in which R''CO is an acyl radical of a detergent-forming monocarboxy acid having at least 8 carbon atoms and not more than 32 carbon atoms; R'CO is an acyl radical of a lower molecular weight carboxy acid having 5 carbon atoms or less; and D is a radical of the class consisting of an alkyl, hydroxyalkyl, aminoalkyl, and acyloxyalkylene, in which instance the acyl group is a member of the class consisting of RCO and R'CO; and the polyacylated polyamine radical must contain a member of the class consisting of: (a) acyloxyalkylene radical in which the acyl group is RCO; and (b) joint occurrence of an amido radical in which the acyl group is RCO and a hydroxyalkyl radical; Z is an acidic hydrogen atom equivalent including the acidic hydrogen atom itself; $n$ represents the numerals 2 to 4; $n'$ represents the numerals 3 to 10; $x$ represents the numerals 0 to 2; $y$ represents the numerals 0 to 2; and $z$ represents the numerals 1 to 3.

3. A process for breaking petroleum emulsions of the water-in-oil type, characterized by subjecting the emulsion to the action of a demulsifier comprising a member of the class consisting of monomers, sub-resinous esterification polymers, and cogeneric sub-resinous heat-rearranged derivatives of the monomers and aforementioned polymers, separately and jointly, and of the following formula:

$$[(C_2H_4O)_{n'}OOCRCOOZ]_x$$
$$C_3H_5O_3-[(C_2H_4O)_{n'}H]_y$$
$$[(C_2H_4O)_{n'}OOCRCOOR_1]_z$$

in which R is a carboxyl-free radical of a dibasic carboxy acid having not over 6 carbon atoms; R₁ is a

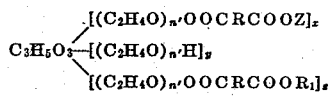

radical in which $n$ represents a small whole number varying from 2 to 10; $x''$ is a small whole number varying from 1 to 10; Z' is a member of the class consisting of H, R''CO, R'CO, and D, in which R''CO is an acyl radical of a detergent-forming monocarboxy acid having at least 8 carbon atoms and not more than 32 carbon atoms; R'CO is an acyl radical of a lower molecular weight carboxy acid having 5 carbon atoms or less; and D is a radical of the class consisting of an alkyl, hydroxyalkyl, aminoalkyl, and acyloxyalkylene, in which instance the acyl group is a member of the class consisting of RCO and R'CO; and the polyacylated polyamine radical must contain a member of the class consisting of: (a) acyloxyalkylene radical in which the acyl group is RCO; and (b) joint occurrence of an amido radical in which the acyl group is RCO and a hydroxyalkyl radical; Z is an acidic hydrogen atom equivalent including the acidic hydrogen atom itself; $n'$ respresents the numerals 3 to 10; $x$ represents the numerals 0 to 2; $y$ represents the numerals 0 to 2; and $z$ represents the numerals 1 to 3.

4. A process for breaking petroleum emulsion of the water-in-oil type, characterized by subjecting the emulsion to the action of a demulsifier comprising a polar member of the class consisting of monomers, sub-resinous esterificatio polymers, and cogeneric sub-resinous heat-rearranged derivatives of the monomers and aforementioned polymers, separately and jointly, an of the following formula:

$$[(C_2H_4O)_{n'}OOCRCOOZ]_x$$
$$C_3H_5O_3-[(C_2H_4O)_{n'}H]_y$$
$$[(C_2H_4O)_{n'}OOCRCOOR_1]_z$$

in which R is a carboxyl-free radical of a dibasi carboxy acid having not over 6 carbon atoms; R is a

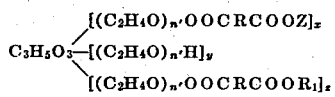

radical in which $n$ represents a small whol number varying from 2 to 10; $x''$ is a sma whole number varying from 1 to 10; Z' is member of the class consisting of H, R''CC R'CO, and D, in which R''CO is an acyl radi cal of a detergent-forming monocarboxy aci having at least 8 carbon atoms and not mor than 32 carbon atoms; R'CO is an acyl radica of a lower molecular weight carboxy acid hav ing 5 carbon atoms or less; and D is a radica of the class consisting of an alkyl, hydroxy alkyl, aminoalkyl, and acyloxyalkylene, in whic instance the acyl group is a member of th class consisting of RCO and R'CO; and th polyacylated polyamine radical must contain member of the class consisting of: (a) acyloxy alkylene radical in which the acyl group is RCC and (b) joint occurrence of an amido radical i which the acyl group is RCO and a hydroxyalk) radical; Z is an acidic hydrogen atom equivalen including the acidic hydrogen atom itself; $n$ represents the numerals 3 to 10; $x$ represents th numerals 0 to 2; $y$ represents the numerals 0 to 2 and $z$ represents the numerals 1 to 3.

5. A process for breaking petroleum emulsion of the water-in-oil type, characterized by sub jecting the emulsion to the action of a demulsi fier comprising a polar acidic member of the clas consisting of monomers, sub-resinous esterifica tion polymers, and cogeneric sub-resinous heat rearranged derivatives of the monomers an aforementioned polymers, separately and jointl) and of the following formula:

$$[(C_2H_4O)_{n'}OOCRCOOZ]_x$$
$$C_3H_5O_3-[(C_2H_4O)_{n'}H]_y$$
$$[(C_2H_4O)_{n'}OOCRCOOR_1]_z$$

in which R is a carboxyl-free radical of a dibasi carboxy acid having not over 6 carbon atoms; R is a

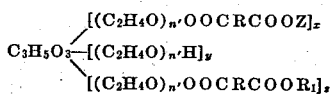

radical in which $n$ represents a small whol number varying from 2 to 10; $x''$ is a smal whole number varying from 1 to 10; Z' is a mem ber of the class consisting of H, R''CO, R'CC and D, in which R''CO is an acyl radical of a de tergent-forming monocarboxy acid having a least 8 carbon atoms and not more than 32 car mon atoms; R'CO is an acyl radical of a lowe molecular weight carboxy acid having 5 carbo atoms or less; and D is a radical of the clas consisting of an alkyl, hydroxyalkyl, aminoalkyl, and acyloxyalkylene, in which instance the acyl group is a member of the class consisting of RCO and R'CO; and the polyacylated polyamine radical must contain a member of the class consisting of: (a) acyloxyalkylene radical in which the acyl group is RCO; and (b) joint occurrence of an amido radical in which the acyl group is RCO and a hydroxyalkyl radical; Z is an acidic hydrogen atom equivalent including the acidic hydrogen atom itself; $n'$ represents the numerals 3 to 10; $x$ represents the numerals 0 to 2; $y$ represents the numerals 0 to 2; and $z$ represents the numerals 1 to 3.

6. A process for breaking petroleum emulsions of the water-in-oil type, characterized by subjecting the emulsion to the action of a demulsifier comprising a polar acidic member of the class consisting of monomers, sub-resinous esterification polymers, and cogeneric sub-resinous heat-rearranged derivatives of the monomers and aforementioned polymers, separately and jointly, and of the following formula:

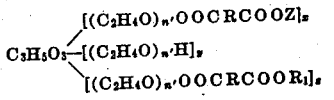
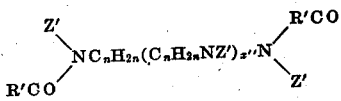

in which R is a carboxyl-free radical of a dibasic carboxy acid having not over 6 carbon atoms; $R_1$ is a

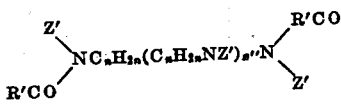

radical in which $n$ represents a small whole number varying from 2 to 10; $x''$ is a small whole number varying from 1 to 10; Z' is a member of the class consisting of H, R''CO, R'CO, and D, in which R''CO is the acyl radical of a higher fatty acid having at least 8 and not more than 32 carbon atoms; R'CO is an acyl radical of a lower molecular weight carboxy acid having 5 carbon atoms or less; and D is a radical of the class consisting of an alkyl, hydroxyalkyl, aminoalkyl, and acyloxyalkylene, in which instance the acyl group is a member of the class consisting of RCO and R'CO; and the polyacylated polyamine radical must contain a member of the class consisting of: (a) acyloxyalkylene radical in which the acyl group is RCO; and (b) joint occurrence of an amido radical in which the acyl group is RCO and a hydroxyalkyl radical; Z is an acidic hydrogen atom equivalent including the acidic hydrogen atom itself; $n'$ represents the numerals 3 to 10; $x$ represents the numerals 0 to 2; $y$ represents the numerals 0 to 2; and $z$ represents the numerals 1 to 3.

7. A process for breaking petroleum emulsions of the water-in-oil type, characterized by subjecting the emulsion to the action of a demulsifier comprising a polar acidic member of the class consisting of monomers, sub-resinous esterification polymers, and cogeneric sub-resinous heat-rearranged derivatives of the monomers and aforementioned polymers, separately and jointly, and of the following formula:

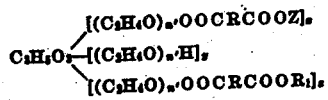

in which R is a carboxyl-free radical of a dibasic carboxy acid having not over 6 carbon atoms; $R_1$ is a

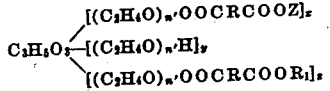

radical in which $n$ represents a small whole number varying from 2 to 10; $x''$ is a small whole number varying from 1 to 10; Z' is a member of the class consisting of H, R''CO, R'CO, and D, in which R''CO is the acyl radical of a higher fatty acid having 18 carbon atoms; R'CO is an acyl radical of a lower molecular weight carboxy acid having 5 carbon atoms or less; and D is a radical of the class consisting of an alkyl, hydroxyalkyl, aminoalkyl, and acyloxyalkylene, in which instance the acyl group is a member of the class consisting of RCO and R'CO; and the polyacylated polyamine radical must contain a member of the class consisting of: (a) acyloxyalkylene radical in which the acyl group is RCO; and (b) joint occurrence of an amido radical in which the acyl group is RCO and a hydroxyalkyl radical; Z is an acidic hydrogen atom equivalent including the acidic hydrogen atom itself; $n'$ represents the numerals 3 to 10; $x$ represents the numerals 0 to 2; $y$ represents the numerals 0 to 2; and $z$ represents the numerals 1 to 3.

8. A process for breaking petroleum emulsions of the water-in-oil type, characterized by subjecting the emulsion to the action of a demulsifier comprising a polar acidic member of the class consisting of monomers, sub-resinous esterification polymers, and cogeneric sub-resinous heat-rearranged derivatives of the monomers and aforementioned polymers, separately, and jointly, and of the following formula:

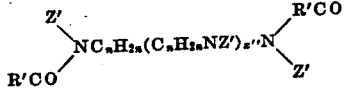

in which R is a carboxyl-free radical of a dibasic carboxy acid having not over 6 carbon atoms; $R_1$ is a radical in which $n$ represents a small whole number varying from 2 to 10; $x''$ is a small whole number varying from 1 to 10; Z' is a member of the class consisting of H, R''CO, R'CO, and D, in which R''CO is a ricinoleyl radical; R'CO is an acyl radical of a lower molecular weight carboxy acid having 5 carbon atoms or less; and D is a radical of the class consisting of an alkyl, hydroxyalkyl, aminoalkyl, and acyloxyalkylene, in which instance the acyl group is a member of the class consisting of RCO and R'CO; and the polyacylated polyamine radical must contain a member of the class consisting of: (a) acyloxyalkylene radical in which the acyl group is RCO; and (b) joint occurrence of an amido radical in which the acyl group is RCO and a hydroxyalkyl radical; Z is an acidic hydrogen atom equivalent including the acidic hydrogen atom itself; $n'$ represents the numerals 3 to 10; $x$ represents the numerals 0 to 2; $y$ represents the numerals 0 to 2; and $z$ represents the numerals 1 to 3.

MELVIN DE GROOTE.
BERNHARD KEISER.